(12) United States Patent
Steele et al.

(10) Patent No.: US 9,412,083 B2
(45) Date of Patent: Aug. 9, 2016

(54) AGGREGATION AND WORKFLOW ENGINES FOR MANAGING PROJECT INFORMATION

(71) Applicant: Bank of America Corporation, Charlotte, NC (US)

(72) Inventors: David M. Steele, Carrollton, TX (US); Jason Dean Vaughn, Jacksonville, FL (US); Edward Gansevoort Sofio, Cornelius, NC (US); Margaret R. Skiljan, St. Louis, MO (US); Rhonda L. Kunsch, Virginia Beach, VI (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/259,301

(22) Filed: Apr. 23, 2014

(65) Prior Publication Data

US 2015/0310361 A1    Oct. 29, 2015

(51) Int. Cl.
*G06Q 10/06* (2012.01)
*G06F 9/44* (2006.01)

(52) U.S. Cl.
CPC .............. *G06Q 10/0633* (2013.01); *G06F 8/20* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 5,895,468 A * | 4/1999 | Whitmyer, Jr. .............. | 705/26.1 |
| 7,058,660 B2 * | 6/2006 | Scott | |
| 7,392,210 B1 * | 6/2008 | MacKay ................ | G06Q 10/06 705/35 |
| 8,818,993 B2 * | 8/2014 | Boyd et al. .................... | 707/722 |
| 2002/0029215 A1 * | 3/2002 | Whitmyer, Jr. ................. | 707/10 |
| 2003/0144969 A1 * | 7/2003 | Coyne .......................... | 705/400 |
| 2004/0139108 A1 * | 7/2004 | Tang et al. ................. | 707/104.1 |
| 2006/0047811 A1 * | 3/2006 | Lau et al. ...................... | 709/225 |
| 2006/0136871 A1 * | 6/2006 | O'Connor et al. ............ | 717/113 |
| 2008/0172596 A1 * | 7/2008 | Weidner ........................ | 715/209 |
| 2008/0313598 A1 * | 12/2008 | Frasher et al. ................ | 717/101 |
| 2010/0185547 A1 * | 7/2010 | Scholar .......................... | 705/80 |
| 2012/0109938 A1 * | 5/2012 | Boyd et al. .................... | 707/722 |

FOREIGN PATENT DOCUMENTS

WO    WO2013003271    *    1/2013

* cited by examiner

*Primary Examiner* — Isaac T Tecklu
(74) *Attorney, Agent, or Firm* — Michael A. Springs

(57) ABSTRACT

A system includes an aggregation engine that initiates a first interface module in response to a first request from a first user that indicates a first type of project information. The aggregation engine also receives, via the first interface module, the first type of project information and stores the first type of project information in a memory. The system additionally includes a workflow engine that initiates one or more workflows that indicate certain project information requested by an external group. The workflow engine retrieves, from the memory and based upon the initiated one or more workflows, a first subset of the first type of project information and formats the first subset of project information according to the workflow. The system also includes an export engine that transmits the formatted first subset of project information to the external group according to the initiated one or more workflows.

18 Claims, 8 Drawing Sheets

FIG. 3

BUILD SHEET – DATABASE MANAGEMENT CONVERSION – 0123456 (300)

| ID (302) | CATEGORY (304) | CONFIGURATION ITEM (306) | VALUE (308) |
|---|---|---|---|
| X1 | APPLICATION SERVER SPECIFICATIONS | SERVER_NAME | SERVER01 |
| X2 | APPLICATION SERVER SPECIFICATIONS | SERVER_ADDRESS | 192.168.1.1 |
| X3 | DATABASE SERVER SPECIFICATIONS | SERVER_NAME | SERVER02 |

| CATEGORY | APPROVERS |
|---|---|
| APPLICATION SERVER SPECIFICATIONS (402a) | APPROVER1 |
| DATABASE SERVER SPECIFICATIONS (402b) | APPROVER2 |
| ... | |

FIG. 4B (58)

| CONFIGURATION ITEM | APPROVERS |
|---|---|
| SERVER_NAME (452a) | APPROVER3, APPROVER4 |
| SERVER_ADDRESS (452b) | APPROVER3 |
| ... | |

AGGREGATION AND WORKFLOW ENGINES FOR MANAGING PROJECT INFORMATION

TECHNICAL FIELD

This invention relates, in general, to aggregation and workflow engines and, more particularly, to aggregation and workflow engines for managing project information.

BACKGROUND

Throughout the lifecycle of a project, a project team may develop a large amount of project information, including project requirements, assumptions, contacts, and build sheets. A single project may last for months or even years, which makes the tasks of maintaining, organizing, and exporting project information difficult. Further, gaining approvals for proposed application and component configurations and tracking these approvals for auditing purposes requires significant expenditures of time and resources.

SUMMARY

In accordance with the present disclosure, disadvantages and problems associated with previous systems for managing project information may be reduced or eliminated.

According to one embodiment of the present disclosure, a system includes an aggregation engine that initiates a first interface module in response to a first request from a first user. The first request indicates a first type of project information, where the first type of project information is project requirements information. The aggregation engine also receives, via the first interface module, the first type of project information and stores the first type of project information in a memory. The aggregation engine initiates a second interface module in response to a second request from a second user. The second request indicates a second type of project information, where the second type of project information is project assumptions information. The aggregation engine also receives, via the second interface module, the second type of project information and stores the second type of project information in the memory. The system also includes a workflow engine that initiates one or more workflows that indicate certain project information requested by an external group. The workflow engine retrieves, from the memory and based upon the initiated one or more workflows, a first subset of the first type of project information and a second subset of the second type of project information. The workflow engine also formats the first subset and second subset of project information according to the initiated one or more workflows. The system additionally includes an export engine that transmits the formatted first and second subset of project information to the external group according to the initiated one or more workflows.

According to another embodiment, a system includes one or more memory modules that store project information. The system also includes one or more processors that are communicatively coupled to the memory modules. The one or more processors initiate a first interface module in response to a first request from a first user. The first request indicates a first type of project information, where the first type of project information is project requirements information. The one or more processors also receive, via the first interface module, the first type of project information and store the first type of project information in the one or more memory modules. The one or more processors additionally initiate a second interface module in response to a second request from a second user. The second request indicates a second type of project information, where the second type of project information is project assumptions information. The one or more processors receive, via the second interface module, the second type of project information and store the second type of project information in the one or more memory modules. The one or more processors also initiate one or more workflows that indicate certain project information requested by an external group. The one or more processors retrieve, from the one or more memory modules and based upon the initiated one or more workflows, a first subset of the first type of project information and a second subset of the second type of project information and format the first subset and second subset of project information according to the initiated one or more workflows. The one or more processors also transmit the formatted first and second subset of project information to the external group according to the workflow.

According to yet another embodiment, a system includes an aggregation engine that initiates a first interface module in response to a first request from a first user that indicates a first type of project information. The aggregation engine also receives, via the first interface module, the first type of project information and stores the first type of project information in a memory. The system additionally includes a workflow engine that initiates one or more workflows that indicate certain project information requested by an external group. The workflow engine retrieves, from the memory and based upon the initiated one or more workflows, a first subset of the first type of project information and formats the first subset of project information according to the workflow. The system also includes an export engine that transmits the formatted first subset of project information to the external group according to the initiated one or more workflows.

Certain embodiments of the disclosed system may provide one or more technical advantages. For example, aggregating project information in a centralized location may allow the system to conserve memory and bandwidth over a system in which pieces of project information are stored in different locations and in different formats across the enterprise and must be located and retrieved from these various locations during an export operation.

In other embodiments, receiving different types of project information through specialized interface modules may save processing power and memory over a system that uses generic interface modules to receive project information. These savings may occur because the system may know, without performing an analysis on the received project information, how to format and store the received information in an appropriate database structure.

In other embodiments, leveraging previously stored project information to populate fields and variables in the system may save processing power and memory over a system that does not reuse stored information and requires the reentry and storage of new information. These savings may occur because the system is able to write project information once and read it many times for use in subsequent tasks without the need to request additional information from the user and store it again.

Certain embodiments of the disclosed system may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 3 illustrates an example build sheet;

FIG. 4A illustrates an example of category approval data;

FIG. 4B illustrates an example of configuration item approval data;

DETAILED DESCRIPTION

Figure 1A:
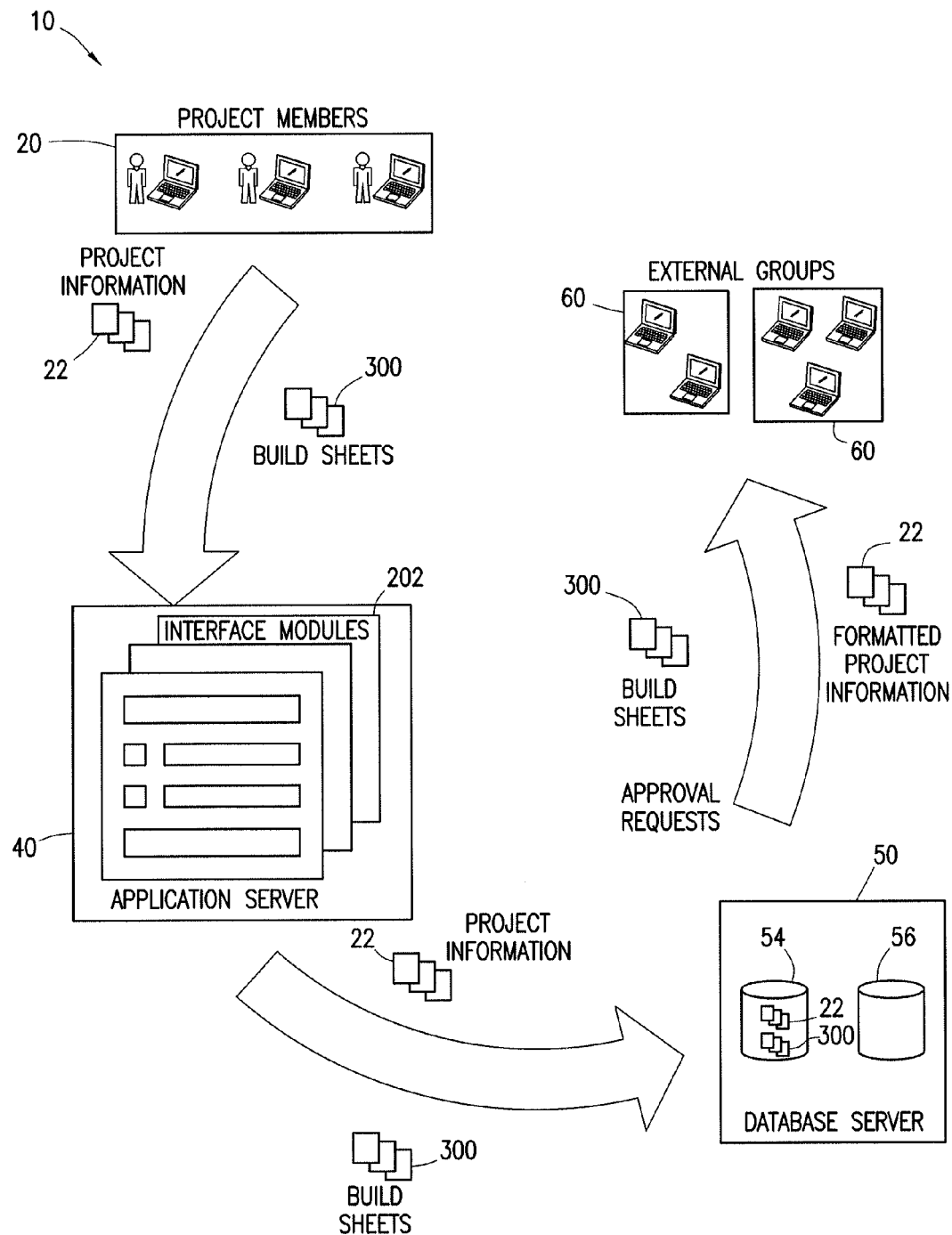
FIG. 1A illustrates a conceptual diagram of one embodiment of a system for managing information generated throughout the lifecycle of a project.

This disclosure describes one embodiment of a system 10 for managing project information 22 generated throughout the lifecycle of a project. Depending upon the project's scope and complexity, a project could remain under development for months or even years. Throughout that time, project members 20 may generate various pieces of project information 22 as they work towards the completion of the project. This project information 22 may include project requirements, project assumptions, project contacts, and the project's expected impact on the infrastructure of an enterprise. The project members 20 may additionally generate build sheets 300 to be used in the development and configuration of various applications and components for the project. System 10 collects project information 22 and build sheets 300 using appropriate interfaces and aggregates such information in appropriate database structures.

External groups 60 may be interested in using certain project information 22 at various points throughout the project's lifecycle. For instance, an external group 60 involved in the financing of the project may desire to view certain project information 22 related to project costs at the beginning of the project to determine whether the project should be undertaken. Certain external groups 60 may wish to view the project information 22 in various formats (e.g., spreadsheets for finance groups, reports for management groups, etc.). System 10 uses workflow engine 46b and workflows 47 to select appropriate project information 22 from storage, format that project information 22, and export the formatted project information 22 to external groups 60.

System 10 also collects project information 22 that may be used in the creation and approval of build sheets 300. Build sheets 300 contain various configuration items 306 and settings that are used to configure software applications, hardware components, and other machines. System 10 may collect such configuration information throughout the course of the project and use workflow engine 46b and workflows 47 to seek approval of build sheets 300 (and their associated configuration items 306 and values 308) from approvers.

FIG. 1A illustrates a conceptual diagram of one embodiment of a system 10 for managing information generated throughout the lifecycle of a project. Specifically, FIG. 1A illustrates the flow of project information 22 and build sheets 300 through system 10. The cycle begins in the upper-left-hand corner of FIG. 1A, where various project members 20 (e.g., engineers, developers, management, administrators, etc.) create project information 22 while working on a particular project. Project members 20 may generate a wide variety of project information 22, including project requirements information (e.g., project milestones, milestone deadlines, expected project deliverables, etc.) and project assumptions information (vendor performance estimates, vendor delivery time estimates, project member 20 availability, etc.), as well as build sheets 300 for use by certain external groups 60, such as, for example, in configuring a server or application for the project.

After project members 20 generate this information, they transmit the project information 22 and build sheets 300 to an application server 40. As illustrated in FIG. 1A, application server 40 receives this information from project members 20 using a set of interface modules 202. These interface modules 202 are configured to receive specific types of project information 22. For instance, one interface module 202 may be configured to receive project requirements information while another interface module 202 may be configured to receive build sheet 300 information.

Upon receiving the project information 22 and build sheets 300 through the interface modules 202, application server 40 transmits this information to a database server 50 for storage. As illustrated in FIG. 1A, database server 54 stores project information 22 and build sheets 300 in aggregation database 54. Such information may be aggregated in aggregation database 54 throughout the course of the project. Aggregating project information 22 in a centralized location (e.g., database server 50) may allow system 10 to conserve memory and bandwidth over a system in which pieces of project information 22 are stored in different locations and in different formats across the enterprise and must be located and retrieved from these various locations during an export operation.

From time to time, project members 20 or external groups 60 may desire to view certain of the project information 22 or build sheets 300. When this occurs, database server 50 exports the requested information to the requesting party in a format appropriate for that requesting party. For instance, a request for project information 22 received from a financial group may result in the export of certain project information 22 in spreadsheet format. Similarly, a request for a build sheet 300 received from an external build team may result in the export of certain build sheets 300 and other information in a format appropriate for an external build tool.

As illustrated in FIG. 1A, approval requests may also be transmitted to external groups 60. This may occur, for instance, when certain project information 22 or build sheets 300 require approval from certain parties before use in the project. For example, certain configurations and settings in a build sheet 300 may require approval from IT management or other parties before such settings can be used to configure components for the project. The approving parties can either approve or deny such project information 22 and build sheets 300. When a party denies a certain setting or configuration, a request may be transmitted to the project member 20 who suggested the denied setting to modify it. The project member 20 may do so and make another request for approval. This setting revision/approval process, in certain embodiments, may continue until all necessary approvals are received.

Figure 1B:
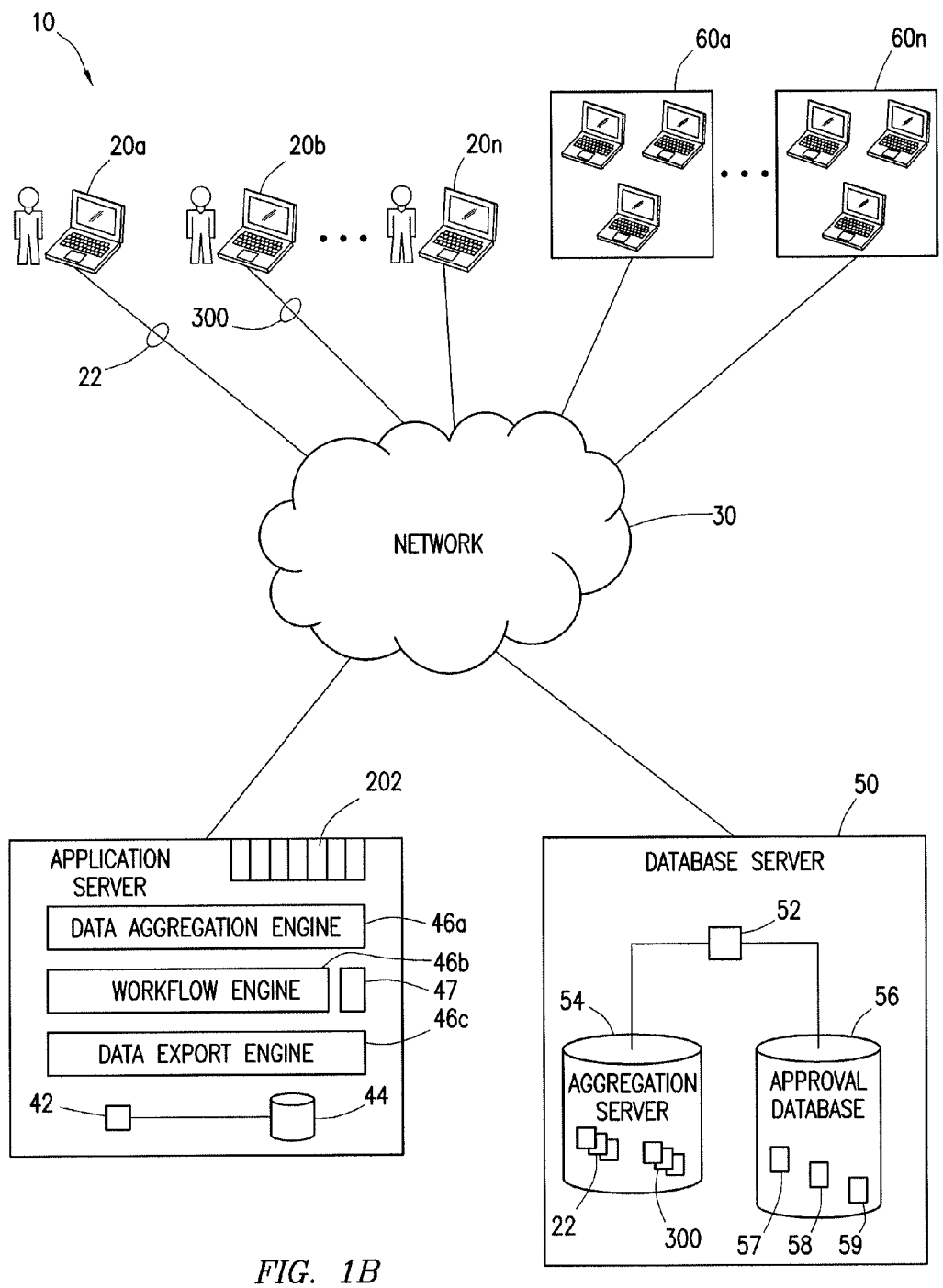
FIG. 1B illustrates one embodiment of a system for managing information generated throughout the lifecycle of a project.

FIG. 1B illustrates one embodiment of system 10. As described in this disclosure, a project, in certain embodiments, may include any task or sets of tasks. For example, in the IT infrastructure space, a project could include the provisioning and configuration of new servers. As another example, a project could include the development of a new mobile phone application. As yet another example, a project could include transitioning from one database management system to another.

As described above, there are at least two main groups involved in the management of project information 22. The first group includes the individuals working towards the completion of the project, illustrated as project members 20*a-n* in FIG. 1B. Project members 20*a-n* may include any party involved in setting requirements for a project, completing tasks for a project, or performing any other appropriate functions associated with the project.

Project members 20 may use any appropriate device to enter project information 22 and build sheets 300 into system 10. System 10 may include any suitable number of project members 20 and associated devices. Project members' 20 devices may include any suitable combination of components that operate to create, manipulate, access, and/or transmit project information 22, respectively, including a personal computer, a workstation, a laptop, a wireless or cellular telephone or other handheld computing device, an electronic notebook, a personal digital assistant, a tablet, or any other device (wireless, wireline, or otherwise) capable of receiving, processing, storing, and/or communicating information with other components of system 10.

Project information 22 may include any information related to the project. As examples, project information 22 may include, in certain embodiments, general project information, project cost estimates, application impact information, infrastructure impact information, project requirements, project assumptions, project savings, project history, project contacts, and project build sheets 300, among others. Build sheets 300 may include configuration and settings that may be used to configure components for use in the project. Build sheets 300 will be discussed in more detail with respect to FIG. 3.

Upon creating project information 22, project members 20 may transmit such project information 22 to application server 40 for aggregation and storage. In certain embodiments, project members 20 transmit project information 22 to application server 40 through a network 30. This disclosure contemplates any suitable network 30 operable to facilitate communication between the components of system 10. Network 30 may comprise a single network or multiple networks and may include any interconnecting system capable of transmitting audio, video, signals, data, messages, or any combination of the preceding. Network 30 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 30 may additionally include any combination of gateways, routers, hubs, switches, access points, base stations, wireless telephone systems and any other hardware, software or a combination thereof.

System 10 includes an application server 40. In certain embodiments, application server 40 receives project information 22 from project members 20 using interface modules 202, aggregates the project information 22, logically groups project information 22, and causes project information 22 to be stored by database server 50. Interface modules 202 and the process of aggregating project information 22 and build sheets 300 will be described in more detail with respect to FIGS. 2A and 2B.

Application server 40 comprises an application server processor 42 communicatively coupled with an application server memory 44. Application server processor 42 and application server memory 44 facilitate the aggregation and storage processes performed by application server 40. Application server processor 42 may include any hardware and/or software that operates to control and process information, including project information 22. Application server processor 42 may be a programmable logic device, a microcontroller, a microprocessor, any suitable processing device or any suitable combination of the preceding.

Application server 40 additionally comprises one or more engines 46. Engines 46 perform various functions to aggregate, group, store, format, and export project information 22. For instance, in some embodiments, application server 40 may include a data aggregation engine 46*a*. Data aggregation engine 46*a* may be communicatively coupled to application server processor 42 and application server memory 44 and may aid application server 40 in receiving and aggregating project information 22 from project members 20. For instance, in certain embodiments, data aggregation engine 46*a* may receive an indication from a project member 20 of a type of project information 22 that the project member 20 desires to input. In response, data aggregation engine 46*a* may determine an appropriate interface module 202 associated with the indication and/or the type of project information 22 to be received. Data aggregation engine 46*a* may then cause the interface module to collect the project information 22 from the project member 20.

Upon receiving project information 22, data aggregation engine 46*a* may, in certain embodiments, logically group certain information together for storage in database server 50. For instance, data aggregation engine 46*b* may select certain project information 22 received from project member 20*a* and group that information with project information 22 received from project member 20*b*. Data aggregation engine 46*a* may group information based upon any appropriate criteria, including the type of project information 22 at issue or the time when project information 22 is received.

In certain embodiments, application server 40 includes a workflow engine 46*b*. Workflow engine 46*b* may detect a triggering event associated with particular project information 22 and, in response, gather appropriate project information 22 to be formatted and transmitted to an external group 60. In general, a triggering event may comprise any signal or event that indicates to workflow engine 46*b* that certain project information 22 should be gathered and transmitted to a particular party. As an example, in certain embodiments, a triggering event may include a request for certain project information 22 by an external group 60. As another example, a triggering event may include a request by a project member 20 to gain approvals for a build sheet 300. As yet another example, a triggering event may occur upon the completion of particular project milestones or after the passage of a certain amount of time from the commencement of the project.

To perform these tasks, in certain embodiments, workflow engine 46*b* may select and operate according to one or more workflows 47. Workflows 47, in certain embodiments, may contain instructions that instruct workflow engine 46*b* as to what operations should be performed with respect to certain project information 22. In certain embodiments, one or more workflows 47 may be associated with a particular triggering event.

Data export engine 46c may operate in conjunction with workflow engine 46b to format and export certain project information 22 to one or more external groups 60 as directed by workflow engine 46b and workflows 47. For instance, data export engine 46c may format certain financial information from project information 22 in spreadsheet format and export the financial information to the appropriate external group 60. Engines 46 may be implemented by application server processor 42 or any other appropriate component of system 10.

In certain embodiments, system 10 may additionally include a database server 50. Database server 50 may be part of or separate from application server 40. Database server 50 may receive project information 22 from application server 40 and store such project information 22 in appropriate database structures. For instance, in certain embodiments, database server 50 includes an aggregation database 54. Aggregation database 54 stores project information 22 that has been received from project members 20 by data aggregation engine 46a for later access by workflow engine 46b and data export engine 46c for export to external groups 60.

Certain types of project information 22 and build sheets 300 may be approved by certain parties throughout the course of the project. Database server 50 aids this approval process through the maintenance of an approval database 56. Approval database 56 may store information regarding approvals of project information 22. In certain embodiments, approvers may provide their approvals of certain project information 22 before the project information 22 may be used in the project. As an example, a certain entry on a build sheet 300 may have an associated approver or group of approvers. These approvers may approve or deny the entries on the build sheet 300 before the build sheet 300 may be used to configure an application or component for use in the project. Additionally, in certain embodiments, approval database 56 may maintain audit information associated with the approval process. For instance, approval database 56 may store information about whether and when certain approvers approved certain entries on a build sheet 300 and/or other project information 22.

To aid in this functionality, approval database 56 includes, in certain embodiments, configuration item approver data 57, configuration category approver data 58 and approval audit data 59. Configuration item approver data 57 may store information that associates a certain approver or group of approvers with certain entries on a build sheet 300. As an example, configuration item approver data 57 may associate a particular approver with configuration items 306 with the identifier SERVER_NAME.

Configuration category approver data 58 may store information that associates a certain approver or group of approvers with a certain category of entries on a build sheet 300. As an example, configuration category approver data 58 may associate a particular approver with any entries on a build sheet 300 categorized as "Application Server Specifications."

Approval audit data 59 may store information that indicates whether and when each approver approved or denied certain entries on a build sheet 300 and/or other project information 22. As an example, approval audit data 59 may indicate that a particular approver approved one entry on a build sheet 300 but denied another entry. As such, approval audit data 59 may be used to construct an audit trail for build sheet 300 and/or other project information 22. This information may be useful to determine the identity of an approver who approved a build sheet 300 that contained incorrect or problematic configuration information.

Database server 50 includes a database server processor 52 that is communicatively coupled to aggregation database 54 and approval database 56. Database server processor 52 may facilitate the storage and retrieval processes performed by database server 50. Database server processor 52 may include any hardware and/or software that operates to control and process information, including project information 22. Database server processor 52 may be a programmable logic device, a microcontroller, a microprocessor, any suitable processing device or any suitable combination of the preceding.

In an exemplary operation of system 10, one or more project members 20 may create project information 22 and indicate a desire to store that project information 22 in system 10. A project member 20 may interact with application server 40 by transmitting an indication of a type of project information 22 to be stored. As an example, project member 20 may indicate that the project information 22 relates to project requirements. In response, application server 40 and data aggregation engine 46a may select an appropriate interface module 202 to receive project information 22. Interface modules 202 will be discussed in further detail with regard to FIGS. 2A and 2B.

Generally, interface module 202 may present appropriate fields to project member 20 to receive the project requirements information—for example, a first field for receiving a first project requirement, a second field for receiving a second project requirement, and a third field for receiving any additional notes or explanations. Aggregation engine 46a may additionally interact with interface module 202 to fill out other portions and fields in the selected interface using project information 22 that has been previously stored in aggregation database 54. For instance, aggregation engine 46b may retrieve certain general project information 22, including the project name, the project number, and other appropriate information, for use with interface modules 202.

After data aggregation engine 46a receives project information 22 from project member 20, it may analyze the received information, group certain information together, and transmit the information to database server 50 for storage. Database server 50 may receive the project information 22 and store such information in aggregation database 54 and/or approval database 56, as appropriate. Returning to the example above where project requirements information is received using interface module 202, aggregation database 54 may store the received project information 22 in particular table or structure associated with project requirements information.

Workflow engine 46b detects, from time to time, triggering events associated with requests for particular project information 22. When workflow engine 46b detects a triggering event, it selects an appropriate workflow 47 based upon the request or triggering event and operates according to that workflow 47. A workflow 47 may direct workflow engine 46b to retrieve certain project information 22 from aggregation database 54. The workflow 47 may additionally instruct data export engine 46c to format the retrieved project information 22 in a certain way and transmit (or otherwise make available) the formatted information to one or more external groups 60.

For example, a particular external group 60 involved in the management of the project may indicate to application server 40 that it desires project information 22 related to project requirements. This may trigger workflow engine 46b to select an appropriate workflow 47 associated with the requesting external group 60 or with the particular type of project information 22 requested (or both) that directs workflow engine 46b to retrieve the requested project information 22 from aggregation database 54. The workflow 47 may instruct export engine 46c to format the selected project requirements data in an executive report format as desired by the external group 60 and transmit the project requirements report to external group 60.

As another example, the triggering event may indicate that approvals should be obtained for certain project information 22, for instance, entries in a build sheet 300. In this example embodiment, workflow engine 46b may gather the entries for which approval is sought and determine approvers associated with those entries. For instance, workflow engine 46b may determine approvers associated with each entry of build sheet 300 using configuration item approver data 57. Additionally, workflow engine 46b may determine approvers associated with the categories for each entry using configuration category approver data 58. Workflow engine 46b may then transmit a request to each approver to approve the entries for which approval is sought.

Workflow engine 46b may then receive responses from the approvers and store such information in approval audit data 59. For instance, workflow engine 46b may store information for each entry indicating the identity of the approver, the date/time the response was received, and whether the entry was approved or denied by the approver. If workflow engine 46b determines that one or more denials have been received for an entry in build sheet 300, workflow engine 46b may send a request to an appropriate project member 20 to make changes to the entry. Project member 20 may then alter configuration item 306 and again request approval from the associated approvers. This process may continue, in certain embodiments, until workflow engine 46b determines that all entries in build sheet 300 have gained approval. When this occurs, workflow engine 46b may transmit the approved build sheet 300 to an external group 60 that will use build sheet 300 to create an application or component for the project.

Figure 2A:
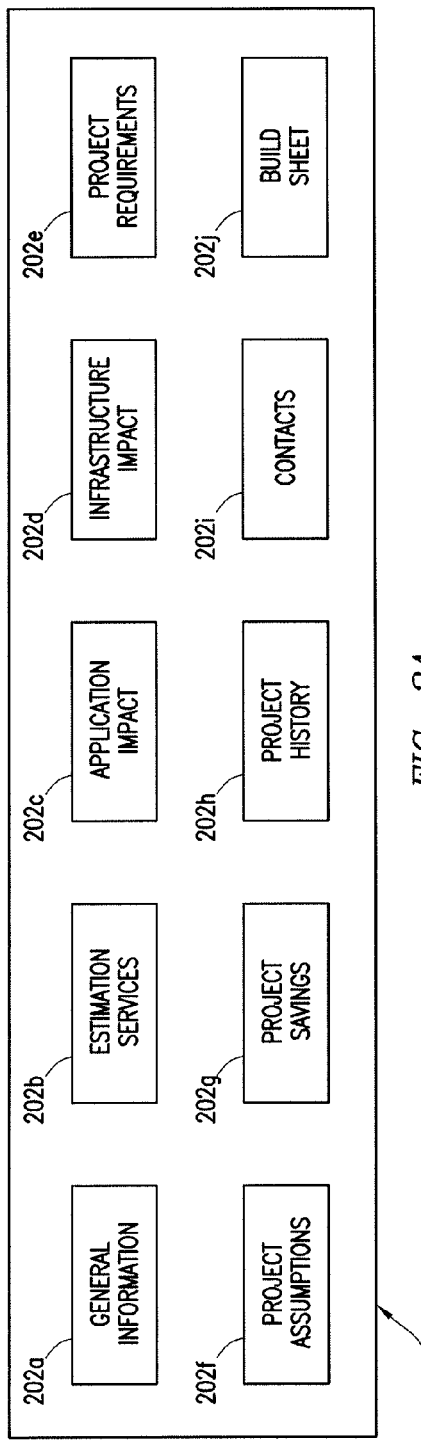
FIG. 2A illustrates an example interface module selector and interface modules for managing project information.

FIG. 2A illustrates an example interface module selector 200 that may be used by data aggregation engine 46a to receive an indication of project information 22 to be received from project members 20. When project members 20 desire to enter project information 22 into system 10, project members 20 may access interface module selector 200. By selecting an interface module 202 from interface module selector 200, project members 20 may indicate to data aggregation engine 46a an appropriate interface module 202 to use to collect the project information 22. For instance, in certain embodiments, project selector 200 may be displayed to project members 20 using a graphical user interface. In this example embodiment, a project member 20 may select an interface module 202 and send an indication of the type of project information 22 to be received by data aggregation 46a by clicking on the appropriate interface module 202. In response to receiving this indication, data aggregation engine 46a may select the indicated interface module 202 to facilitate the reception of project information 22. As described above, each interface module 202 may be associated with a specialized interface to receive certain project information 22.

FIG. 2A illustrates several example interface modules 202. Interface module selector 200 may include some, all, or none of the example interface modules 202. Additionally, interface module selector 200 may include additional interface modules 202 that receive different project information than that described below in this example embodiment.

Project member 20 may select general information interface module 202a when project member 20 desires to enter general information regarding the project. For example, general information interface module 202a may facilitate receiving general project information 22 including a project name, a project number, a billing number, project status notes, and project objectives.

Project member 20 may select estimation services interface module 202b when project member 20 desires to enter information to create a cost estimate for the project. For example, estimation services interface module 202b may facilitate receiving project information 22 including the amount of time expected to be used on the project, the number of team members 20 to work on the project, the amount of equipment that will need to be procured for the project, and any other information that allows system 10 to estimate the cost of a project.

Project member 20 may select application impact interface module 202c when project member 20 desires to enter information regarding the anticipated impact of the project on other applications. For example, application impact interface module 202c may facilitate receiving notes and other data from project members 20 regarding how a particular application or component under development in a project may affect other applications in the enterprise.

Project member 20 may select infrastructure impact interface module 202d when project member 20 desires to enter information regarding the anticipated impact of the project on the infrastructure of the enterprise. For example, infrastructure impact interface module 202d may facilitate receiving notes and other data from project members 20 that identifies how a particular application or component under development in a project may affect other the overall infrastructure or other components in the enterprise.

Project member 20 may select project requirements interface module 202e when project member 20 desires to enter project requirements for the project. For example, project requirements interface module 202e may facilitate receiving milestone deadlines, project deliverables, and other project requirements information.

Project member 20 may select project assumptions interface module 202f when project member 20 desires to enter project assumptions for the project. For example, project assumptions interface module 202f may facilitate receiving project member 20 availability, vendor delivery times, and vendor performance issues.

Project member 20 may select project savings interface module 202g when project member 20 desires to enter information to enter information to calculate the anticipated cost savings that the enterprise will realize by undertaking the project. For example, project savings interface module 202g may facilitate receiving anticipated time savings, anticipated component savings, and other information to be used in calculating the cost savings associated with a project.

Project member 20 may select project history interface module 202h when project member 20 desires to enter information to enter information related to the history of the project. For example, project history interface module 202h may facilitate receiving previous solutions attempted, previous project members 20 involved in the project, and any additional historical data related to the project.

Project member 20 may select project contacts interface module 202i when project member 20 desires to enter contact information for the project. For example, project contacts interface module 202i may facilitate receiving names, telephone numbers, and responsibilities of various project members 20 involved on a project.

Project member 20 may select project build sheet interface module 202j when project member 20 desires to enter various settings in a build sheet 300 to be used to configure applications or other components for use in the project. For example, build sheet interface module 202j may facilitate receiving configuration items 306, associated values 308, and additional information for a build sheet 300. Build sheets 300 will be described in further detail with regard to FIG. 3.

Figure 2B:
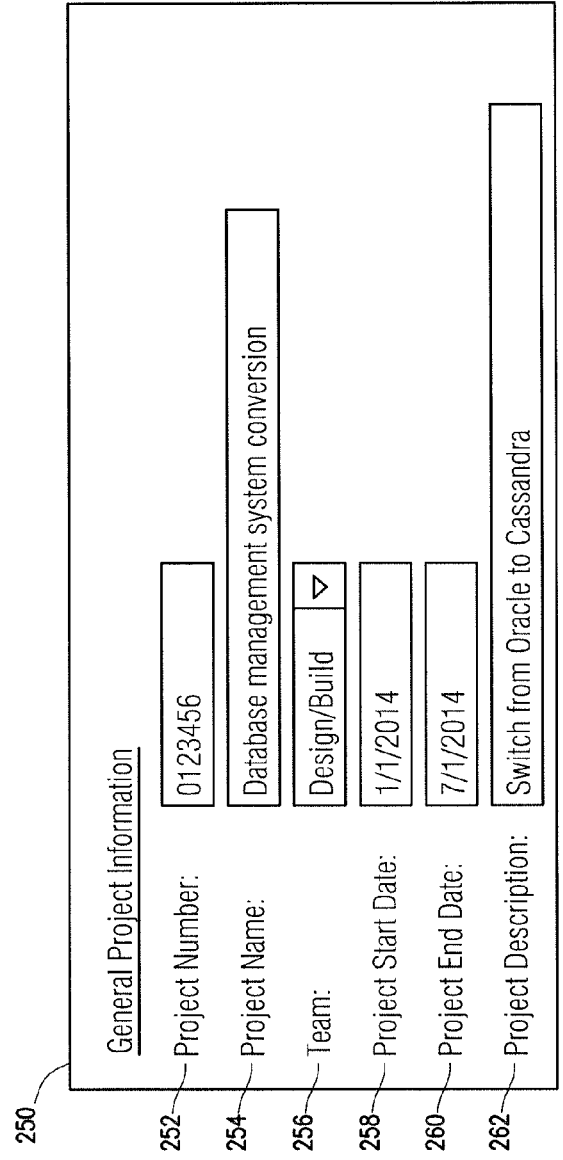
FIG. 2B illustrates an example interface for aggregating project information.

FIG. 2B illustrates an example general information interface 250 that general information interface module 202a may use to facilitate receiving general project information 22. As described above, project member 20 may provide an indication that he desires to enter general project information 22 by selecting general information interface module 202a from interface module selector 200. As illustrated in FIG. 2B, general information interface 250 may contain fields for receiving a project number 252, a project name 254, a team 256 associated with the project, a project start date 258, a project end date 260, and a project description 262. Upon inputting the general project information into general information interface 250, project member 20 may submit the project information 22 for aggregation and storage. Aggregation engine 46a may receive the inputted project information 22 from general information interface 250, logically group project information 22 and store such information as appropriate in aggregation database 54.

Engines 46 may then use certain of general project information received from general information interface 250 for populating fields and other interfaces and in generating reports and other deliverables for external groups 60. For example, project number 252 entered into general project interface 250 may be included as information in numerous other interfaces and may be displayed on various reports and other deliverables exported to external groups 60.

FIG. 3 illustrates an example build sheet 300 that may be created, updated, approved, and/or used during the course of a project. As described above, build sheets 300 may be used to configure software applications or hardware components. As an example, a build sheet 300 may contain configuration information for a Java Virtual Machine. Generally, however, a build sheet 300 may contain any information, settings, or configurations to be used to perform tasks in a project.

As shown in the example embodiment illustrated in FIG. 3, a build sheet 300 may include various build sheet entries 310, each indicating a configuration or setting. Build sheet 300 may be created by one or more project members 20 throughout the course of a project. For instance, one project member 20 may create a first build sheet entry 310a at a first time while another project member 20 may create a second build sheet entry 310b at a second time.

A build sheet entry 310 may include an entry ID 302, a category 304, a configuration item 306, and a value 308. System 10 may use entry ID 302 to uniquely identify a particular build sheet entry 310. For example, build sheet entry 310a has an entry ID 302 of X1 while build sheet entry 310b has an entry ID 302 of X2. Category 304 may indicate a particular category of configurations or settings to which a build sheet entry 310 relates. Category 304 may indicate, for instance, that a build sheet entry 310 is associated with server hardware naming conventions or with domain controller settings. Using the example illustrated by FIG. 3, build sheet entry 310a has an associated category 304 of "Application Server Specifications," which indicates that build sheet entry 310a involves specifications for application servers. Build sheet entry 310c has an associated category 304 of "Database Server Specifications," which may indicate that build sheet entry 310c involves specifications for database servers. As described earlier with respect to approval database 56, a certain category 304 may be associated with one or more approvers who approve build sheet entries 310 in a particular category 304.

A configuration item 306 indicates the type of configuration or setting described in a build sheet entry 310. In certain embodiments, configuration item 306 may be a variable name to be used by an external build platform in creating an application or component. For example, a configuration item 306 may be associated with a variable to store a server's name, a component's network address, etc. Values 308 contains the value to be associated with the configuration or setting contained in configuration item 306. For example, value 308 may be the actual name proposed for a server, the network address proposed for a component, etc. Values 308 may, in certain embodiments, comprise the value to be stored in the variable indicated by configuration item 306. Using the example illustrated in FIG. 3, build sheet entry 310a has a configuration item 306 of SERVER_NAME. This configuration item 306 may be used to name a particular component. Build sheet entry 310a has an associated value 308 of SERVER01. This value 308 may be provided by a project member 20 as a suggestion of a name to use for a particular server. As another example, build sheet entry 310b has a configuration item 306 of SERVER_ADDRESS and an associated value 308 of 192.168.1.1. Again, this value 308 may be provided by a project member 20 as a suggestion of a network address to use for a particular server.

FIGS. 4A and 4B illustrate example category approver data 57 and configuration item approver data 58, respectively. In certain embodiments, such data may be stored in appropriate database formats in approval database 56. As illustrated in FIGS. 4A and 4B, different approvers may be associated with various categories 304 and configuration items 306. This may be the case because particular approvers may have expertise or oversight in a particular area. For instance, one approver may have oversight over the names given to servers and may review configuration items 306 that deal with naming conventions for servers. Another approver may have oversight over assigning network addresses to servers and may review configuration items 306 that deal with network addressing schemes.

As described above, category approver data 57 associates particular categories 304 with an approver or group of approvers who will approve build sheet entries 310 with associated category 304 before they are used in the project. Workflow engine 46b may access such category approver data 57 when determining what approvals are sought for a build sheet 300.

Returning to build sheet 300 illustrated in FIG. 3 as an example, build sheet entries 310a and 310b have an associated category 304 of "Application Server Specifications." Category approver data 57 illustrated in FIG. 4A and, specifically, category approver entry 402a indicates that build sheet entries 310 associated with the "Application Server Specifications" category 304 will be approved by Approver1. Similarly, build sheet entry 310c has an associated category 304 of "Database Server Specifications." Category approver data 57 illustrated in FIG. 4A and, specifically, category approver entry 402b indicates that build sheet entries 310 associated with the "Database Server Specifications" category 304 will be approved by Approver2.

Turning now to FIG. 4B, configuration item approver data 58 associates particular configuration items 306 with an approver or group of approvers who will approve build sheet entries 310 with associated configuration item 306 before they are used in the project. Workflow engine 46b may access such configuration item approver data 58 when determining what approvals are sought for a build sheet 300.

Returning to build sheet 300 illustrated in FIG. 3 as an example, build sheet entries 310a and 310c have configuration item 306 of SERVER_NAME. Configuration item approver data 58 illustrated in FIG. 4B and, specifically, configuration item approver entry 452a indicates that build sheet entries 310 associated with a SERVER_NAME configuration item 306 will be approved by Approver3 and Approver4. Build sheet entry 310b has an associated configuration item 306 of SERVER_ADDRESS. Configuration item approver data 58 illustrated in FIG. 4B and, specifically, category approver entry 452b indicates that build sheet entries 310 associated with a SERVER_ADDRESS configuration item 306 will be approved by Approver3.

Figure 5:
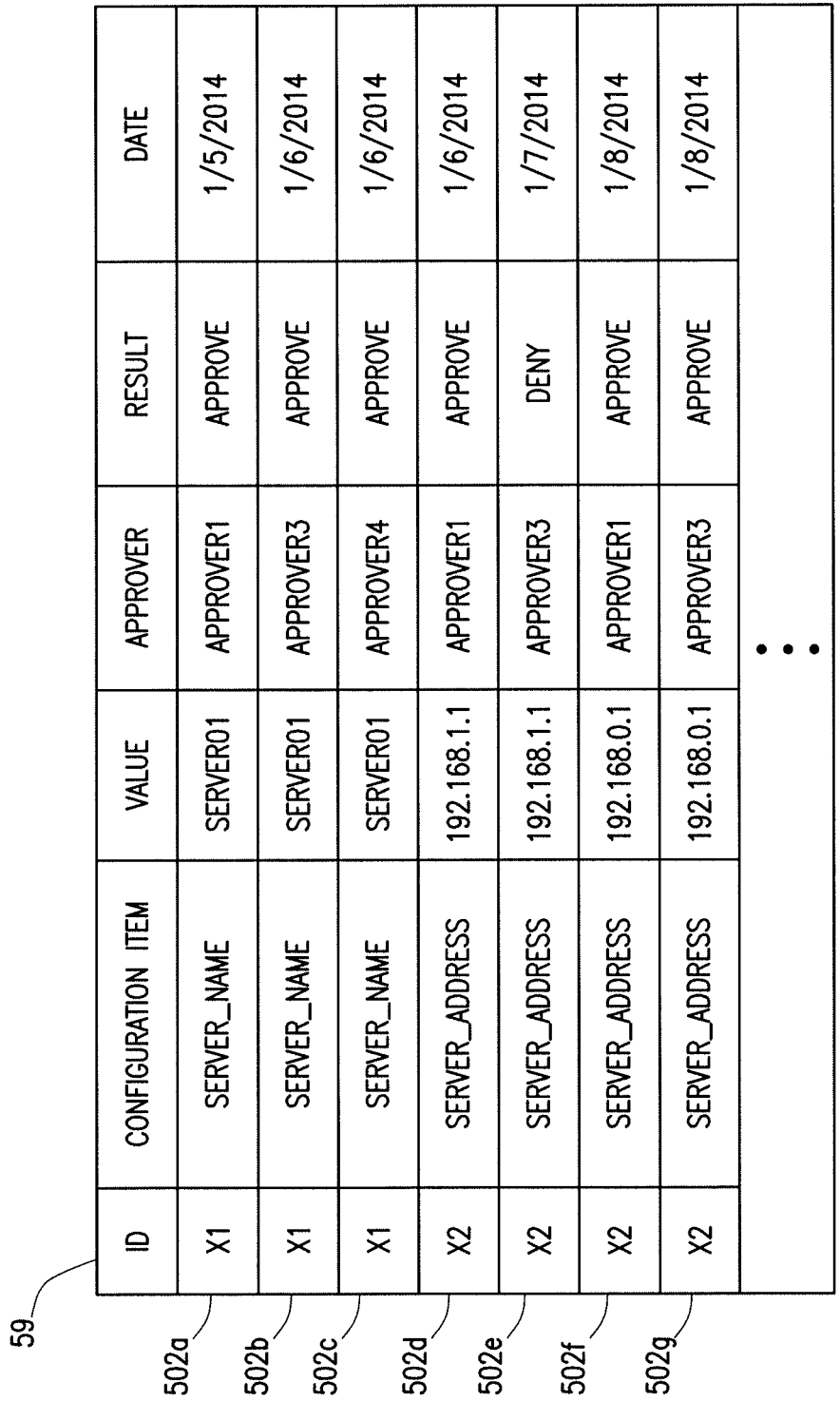
FIG. 5 illustrates an example of approval audit data for a build sheet.

FIG. 5 illustrates example approval audit data 59 that may result after approvals have been sought from appropriate approvers for build sheet entries 310a and 310b illustrated in FIG. 3. As described above, workflow engine 46b may seek the approval of build sheet entries 310 at appropriate times during the project lifecycle. For instance, workflow engine 46b may seek the approval of build sheet entries 310 upon receiving a request from project member 20 to gain the approvals for a build sheet 300. Workflow engine 46b may analyze build sheet entries 310 to determine appropriate approvers.

In this example, workflow engine 46b analyzes build sheet entry 310a and determines that Approver1, Approver3, and Approver4 are appropriate approvers for build sheet entry 310a. For instance, workflow engine 46b may determine that Approver1 should approve build sheet entry 310a because Approver1 is associated with category 304 Application Server Specifications. Additionally, workflow engine 46b may determine that Approver3 and Approver4 should approve build sheet entry 310a because Approver3 and Approver4 are both associated with configuration item 306 SERVER_NAME. Workflow engine 46b may request approval for build sheet entry 310a from these approvers. In certain embodiments, workflow engine 46b may transmit a request for approval to each approver via email.

Workflow engine 46b may later receive indications of whether each of the approvers have approved or denied build sheet entry 310a and store information regarding the approvers' responses in approval audit data entries 502. In this particular example and as illustrated in FIG. 5, (1) approval audit data entry 502a indicates that Approver1 approved build sheet entry 310a on Jan. 5, 2014; (2) approval audit data entry 502b indicates that Approver3 approved build sheet entry 310a on Jan. 6, 2014; and (3) approval audit data entry 502c indicates that Approver4 approved build sheet entry 310a on Jan. 6, 2014. As such, approval audit data entries 502a-c may comprise an audit trail and indicate which approvers approved particular configuration items 306 and values 308 for build sheet entry 310a.

Further in this example, workflow engine 46b also analyzes build sheet entry 310b and determines that Approver1 and Approver3 are appropriate approvers for build sheet entry 310b. For instance, workflow engine 46b may determine that Approver1 should approve build sheet entry 310b because Approver1 is associated with category 304 Application Server Specifications. Additionally, workflow engine 46b may determine that Approver3 should approve build sheet entry 310b because Approver3 is associated with configuration item 306 SERVER_ADDRESS. Workflow engine 46b may request approval for build sheet entry 310b from these approvers.

Workflow engine 46b may later receive indications of whether each of the approvers have approved or denied build sheet entry 310b and store information regarding the approvers' responses in approval audit data entries 502. In this particular example and as illustrated in FIG. 5, (1) approval audit data entry 502d indicates that Approver1 approved build sheet entry 310b on Jan. 6, 2014; and (2) approval audit data entry 502e indicates that Approver3 denied build sheet entry 310b on Jan. 7, 2014.

Workflow engine 46b may determine that build sheet entry 310b has been denied because at least one approver has denied it. In response, workflow engine 46b may, in certain embodiments and in response to workflow 47, transmit a request to an appropriate project member 20 to make changes to build sheet entry 310b, for instance, to configuration item 306 and/or value 308. After project member 20 makes changes to build sheet entry 310b, project member 20 may resubmit build sheet entry 310b for approval. Workflow engine 46b may again transmit requests for approval to the associated approvers. Thus, in this example, workflow engine 46 may retransmit requests for approval to Approver1 and Approver3. Workflow engine 46b may later receive indications of whether each of the approvers have approved or denied build sheet entry 310b and again store information regarding the approvers' responses in approval audit data entries 502. In this particular example and as illustrated in FIG. 5, project member 20 changed value 308 in build sheet entry 310b from 192.168.1.1 to 192.168.0.1 before resubmitting build sheet entry 310b for approval. Approval audit data entry 502f indicates that Approver1 approved build sheet entry 310b on Jan. 8, 2014; and approval audit data entry 502g indicates that Approver3 approved build sheet entry 310b on Jan. 8, 2014. As a result, workflow engine 46b may determine that all necessary approvals have now been received for build sheet entry 310b and thus build sheet entry 310b has been approved.

In certain embodiments, workflow engine 46b may track received approvals for build sheet entries 310 from various approvers to determine when all build sheet entries 310 contained in a build sheet 300 have been approved. When all build sheet entries 310 have been approved, workflow engine 46b may direct data export engine 46c to export the approved build sheet 300 to an appropriate external group 60. In certain embodiments, data export engine 46c may export build sheet 300 to an external build team who will build an application or component using the various configuration items 306 and values 308 contained in build sheet 300.

Figure 6:
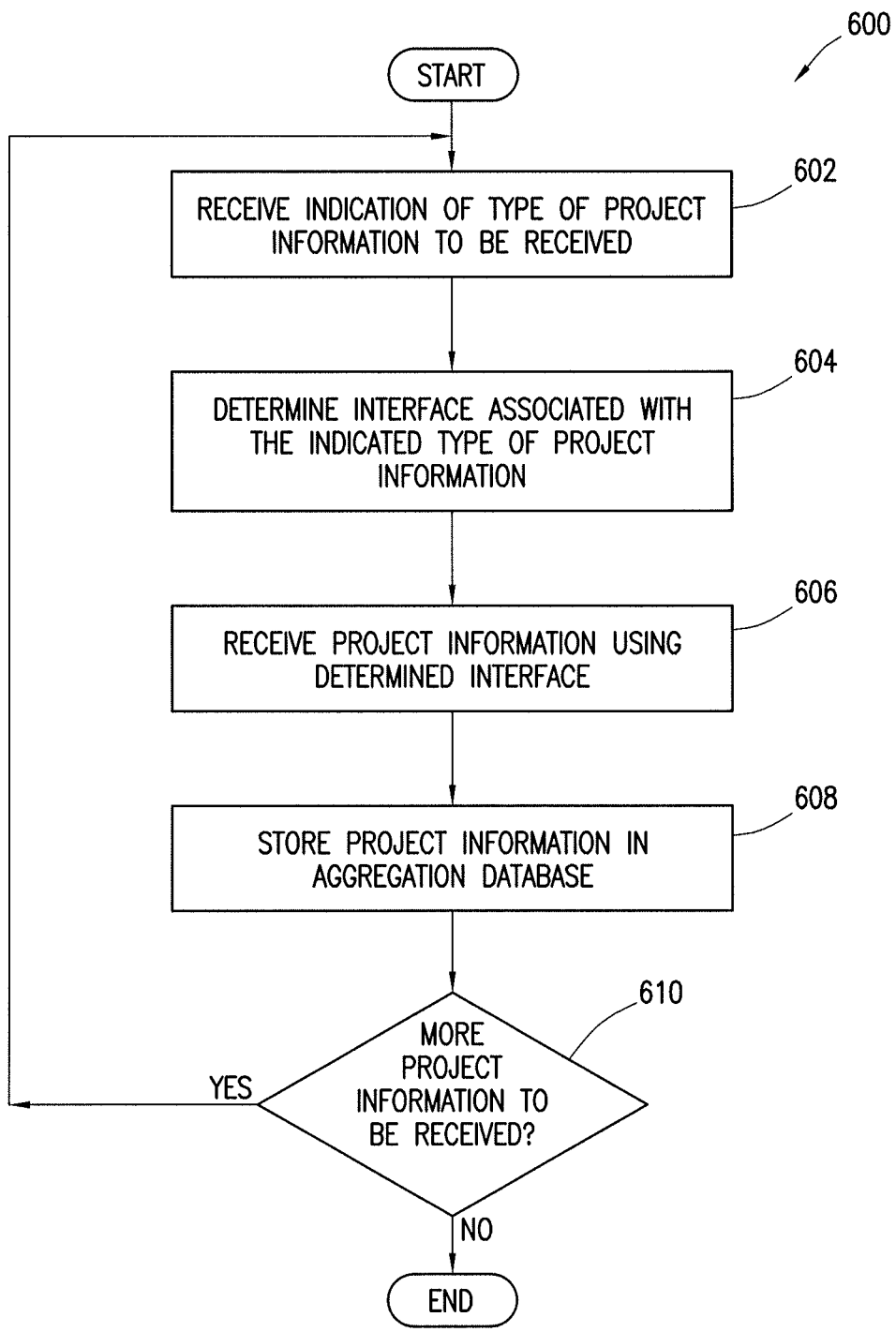
FIG. 6 illustrates an example method for using an aggregation engine to aggregate project information.

FIG. 6 illustrates an example method for using aggregation engine 46a to aggregate project information 22. The method begins as step 602 where aggregation engine 46a receives an indication of a type of project information 22 to be received. As described above, such indication may be received from project members 20 via a selection of an interface module 202 from interface module selector 200. For instance, project member 20 may select build sheet interface module 202i when project member 20 desires to enter various configuration items 306, settings, and values 308 for a build sheet 300.

In response to receiving the indication, at step 604, aggregation engine 46a determines an appropriate interface associated with the indicated type of project information 22 to be received. For instance, data aggregation engine 46a may select the indicated interface module 202 (e.g., build sheet interface module 202i) to facilitate the reception of project information 22. As described above, each interface module 202 may be associated with a specialized interface to receive certain project information 22. An interface associated with build sheet interface module 202i may receive, for example, configuration items 306, values 308, and categories 304.

At step 606, aggregation engine 46a receives project information 22 from project member 20 using the determined interface. At step 608, data aggregation engine 46a may cause project information 22 to be stored by aggregation server 50. As part of the storage process, data aggregation engine 46a may logically group certain project information 22 and store project information 22 in appropriate database structures within aggregation database 54 or approval database 56.

Operation continues to step 610 where aggregation engine 46a determines whether additional project information 22 will be received. If so, operation returns to step 602 where data aggregation engine 46a receives an indication of the type of project information 22 to be received from project member 20. If there is no more project information 22 to be received, the process ends.

Figure 7:
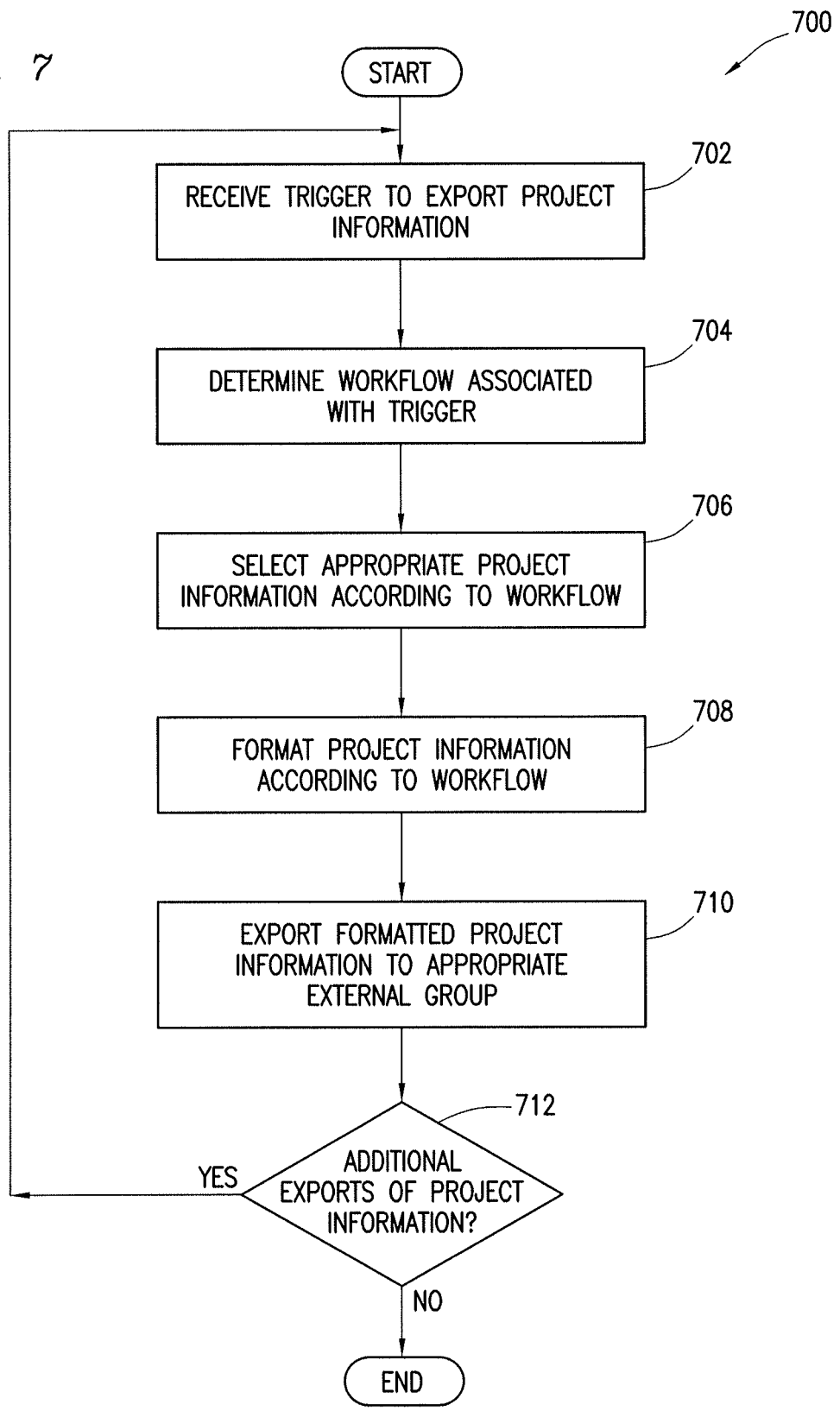
FIG. 7 illustrates an example method for using export and workflow engines to export project information.

FIG. 7 illustrates an example method for using workflow engine 46b and export engine 46c to gather project information 22 and export selected project information 22 to external groups 60. Operation begins at step 702 where workflow engine 46b detects a triggering event that indicates that certain project information 22 should be exported to an external group 60. As described above, a triggering event may comprise any signal or event that indicates to workflow engine 46b that certain project information 22 should be gathered and transmitted to a particular party. As an example, in certain embodiments, a triggering event may include a request for certain information by an external group 60. As another example, a triggering event may include a request by a project member 20 to gain approvals for a build sheet 300.

At step 704, workflow engine 46b determines one or more workflows 47. The workflows 47 may be associated with the detected triggering event and may instruct workflow engine 46b to perform certain operations with respect to project information 22. For instance, a triggering event that is associated with a request for certain project information 22 by an external group 60 may cause workflow engine 46b to select a workflow 47 that causes workflow engine 46b to retrieve the requested project information 22 and format the information according to the preferences of the requesting external group 60. As another example, a triggering event that is associated with a request to gain approvals for a build sheet 300 may cause workflow engine 46b to determine the approvers associated with build sheet 300 and transmit requests for approval to the approvers for certain build sheet entries 310.

At step 706, workflow engine 46b acts in accordance with the selected workflow 47 and selects appropriate project information 22 for exporting. Such project information 22 may be taken from aggregation database 54 and/or approval database 56. Workflow 47 may additionally specify a format for the selected project information 22. Thus, at step 708, data export engine 46c may format project information 22 as directed by workflow 47. For example, certain external groups 60 interested in the financial state of the project may desire to view financial project information 22 in spreadsheet format. As another example, some external groups 60 may desire to receive project information 22, including build sheets 300, in XML format for use in building applications and other components.

At step 710, data export engine 46c may determine appropriate external groups 60 from workflow 47 and may export the formatted project information 22 to the appropriate external groups 60. At step 712, it is determined whether there are additional exports of project information 22 to be performed. If so, operation continues at step 702 where another triggering event is detected to export certain project information 22. If there are no additional exports of project information 22 to be performed, operation ends.

Figure 8:
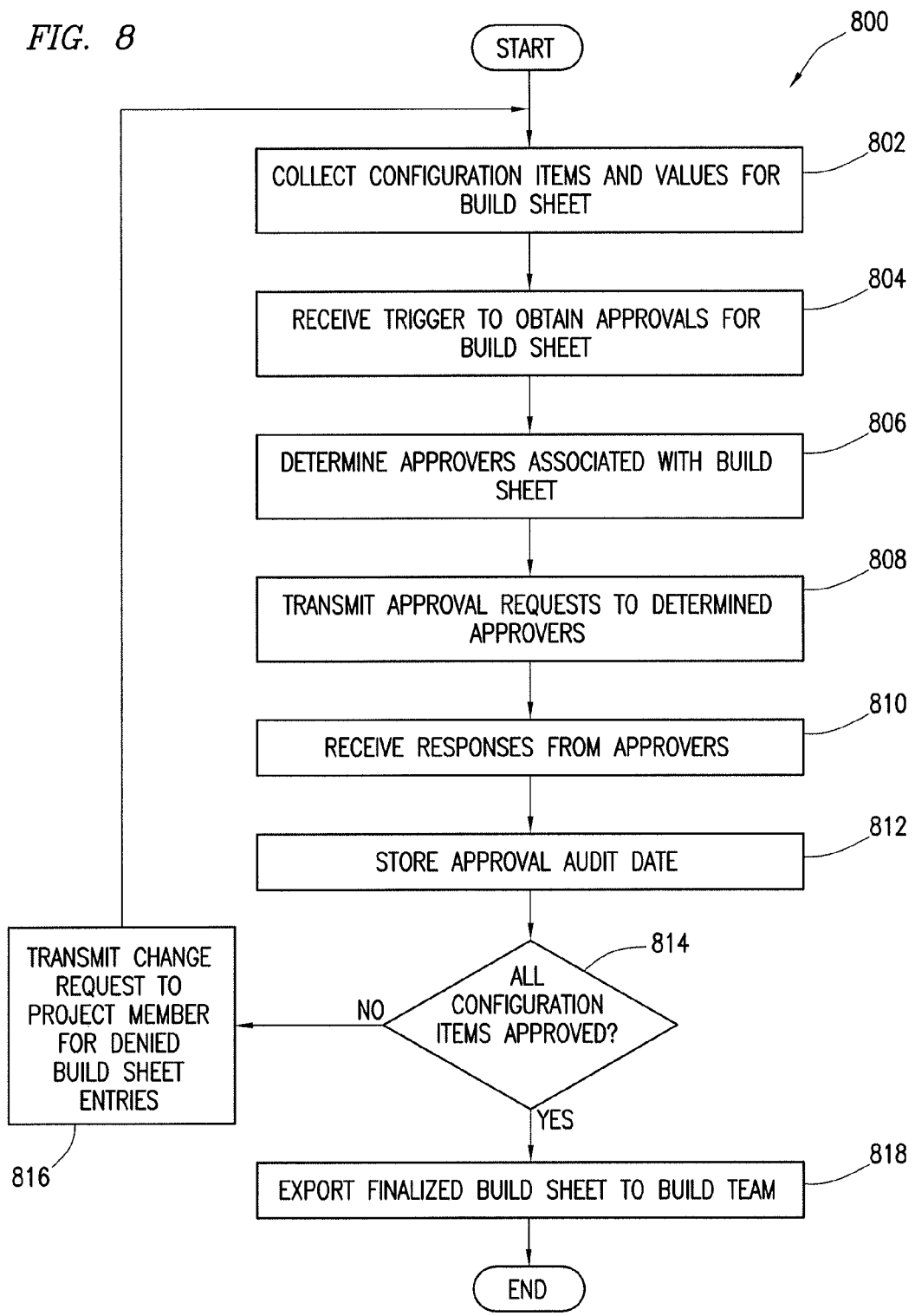
FIG. 8 illustrates an example method for using a workflow engine to obtain approvals for a build sheet.

FIG. 8 illustrates an example method for using workflow engine 46b to gain approvals for build sheet 300. Operation begins at step 802 where aggregation engine 46a collects project information 22 from project members 20. Certain of this project information 22 includes build sheet entries 310 for a build sheet 300 and their associated configuration items 306 and values 308. For a given build sheet 300, this process may continue throughout the lifecycle of the project as additional configuration items 306 and values 308 are determined by project members 20.

At step 804, workflow engine 46b detects a triggering event associated with a request to obtain approvals for build sheet 300. Such a triggering event may occur upon the entry of a certain number of configuration items 306 and values 308 in a build sheet 300 or upon a request by project member 20 or external group 60. As described above, upon detecting the triggering event, workflow engine 46b may determine a workflow 47 and operate according to instructions in workflow 47.

At step 806, workflow engine 46b may determine approvers for build sheet 300. To do so, in certain embodiments, workflow engine 46b may match categories 304 and configuration items 306 from build sheet entries 310 in build sheet 300 with categories 304 in category approver data 58 and configuration item approver data 57, respectively. As described above, each build sheet entry 310 may have one or more associated approvers.

Upon determining the approvers associated with each build sheet entry 310 in build sheet 300, operation continues to step 808 where workflow engine 46b transmits approval requests to the determined approvers. These approval requests may be transmitted in email form. At step 810, workflow engine 46b receives responses from the approvers indicating whether the approvers approved or denied each build sheet entry 310 within build sheet 300. In certain embodiments, approvers may indicate their choice using an interface provided by application server 40 or database server 50.

At step 812, workflow engine 46b determines and stores approver audit data 59 that indicates whether and when each approver approved or denied a particular build sheet entry 310. At step 814, workflow engine 46b determines whether all build sheet entries 310 were approved by the approvers. If all build sheet entries 310 were approved, operation continues at step 818 where export engine 46c may export the finalized build sheet 300 to an appropriate external group 60, for example, an external build team. If, however, certain build sheet entries 310 were not approved, operation continues to step 816 where workflow engine 46b may transmit a request to an appropriate project member 20 to review and make changes to any denied build sheet entries 310. Operation then returns to step 802 where aggregation engine 46a collects build sheet entries 310, including changes to build sheet entries 310, from project members 20.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising a first interface module, a memory, processor a second interface module, and a receiving interface module and further comprising:
    an aggregation engine, executed by the processor to:
        initiate the first interface module in response to a first request from a first user, the first request indicating a first type of project information, wherein the first type of project information comprises project requirements information;
        receive, via the first interface module, the first type of project information;

store the first type of project information in the memory;
initiate the second interface module in response to a second request from a second user, the second request indicating a second type of project information, wherein the second type of project information comprises project assumptions information;
receive, via the second interface module, the second type of project information; and
store the second type of project information in the memory;
a workflow engine, executed by the processor to:
initiate one or more of a plurality of workflows, wherein the initiated one or more workflows indicate certain project information for approval by an external group;
retrieve, from the memory and based upon the initiated one or more workflows, a first subset of the first type of project information and a second subset of the second type of project information;
format the first subset and second subset of project information according to the initiated one or more workflows;
an export engine, executed by the processor to transmit the formatted first and second subset of project information and a request for approval to a first external group and a second external group according to the initiated one or more workflows;
receive, via the receiving interface module, a first response from the first external group and a second response from the second external group, the first and second responses comprising one of an approve response and a deny response;
upon a determination that the first response is an approve response and the second response is an approve response, communicate the first and second responses to at least one of the first user and the second user; and
store, in the memory, audit approval data in an audit log, the audit approval indicating the identity of the first and second external groups, the time the first and second responses were received, and whether the first and second responses were approve responses or deny responses, wherein the data aggregation engine is further operable to logically group the first and second type of project information before storage in the memory.

2. The system of claim 1, wherein the workflow engine is further operable to:
detect a triggering event associated with a received request for project information from the external group; and
determine the one or more workflows based upon the triggering event.

3. The system of claim 1, wherein the workflow engine is further operable to:
detect a triggering event associated with a received request to obtain an approval of project information; and
determine the one or more workflows based upon the triggering event.

4. The system of claim 1, wherein the aggregation engine is further operable to:
initiate a third interface module in response to a third request from the second user, the third request indicating a third type of project information, wherein the third type of project information comprises infrastructure impact information;
receive, via the third interface module, the third type of project information; and
store the third type of project information in the memory.

5. The system of claim 4, wherein the workflow engine is further operable to:
retrieve, from the memory and based upon the initiated one or more workflows, a third subset of project information; and
format the third subset of project information according to the initiated one or more workflows.

6. The system of claim 1, wherein the project requirements information comprises one or more of the following:
project milestones;
project milestone deadlines; and
project deliverables.

7. A system, comprising:
one or more memory modules operable to store project information;
one or more processors communicatively coupled to the memory modules executable by the one or more processor to:
initiate a first interface module in response to a first request from a first user, the first request indicating a first type of project information, wherein the first type of project information comprises project requirements information;
receive, via the first interface module, the first type of project information;
store the first type of project information in the one or more memory modules;
initiate a second interface module in response to a second request from a second user, the second request indicating a second type of project information, wherein the second type of project information comprises project assumptions information;
receive, via the second interface module, the second type of project information;
store the second type of project information in the one or more memory modules;
initiate one or more of a plurality of workflows, wherein the initiated one or more workflows indicate certain project information for approval by an external group;
retrieve, from the one or more memory modules and based upon the initiated one or more workflows, a first subset of the first type of project information and a second subset of the second type of project information;
format the first subset and second subset of project information according to the initiated one or more workflows;
transmit the formatted first and second subset of project information and a request for approval to a first external group and a second external group according to the initiated one or more workflows;
receive, via a receiving interface module, a first response from the first external group and a second response from the second external group, the first and second responses comprising one of an approve response and a deny response;
upon a determination that the first response is an approve response and the second response is an approve response, communicate the first and second responses to at least one of the first user and the second user; and
store, in the memory, audit approval data in an audit log, the audit approval indicating the identity of the first and second external groups, the time the first and second responses were received, and whether the first and second responses were approve responses or deny responses, wherein the one or more processors are further executed to logically group the first and second type of project information before storage in the memory.

8. The system of claim 7, wherein the one or more processors are further operable to:
detect a triggering event associated with a received request for project information from the external group; and
determine the one or more workflows based upon the triggering event.

9. The system of claim 7, wherein the one or more processors are further operable to:
 detect a triggering event associated with a received request to obtain an approval of project information; and
 determine the one or more workflows based upon the triggering event.

10. The system of claim 7, wherein the one or more processors are further operable to:
 initiate a third interface module in response to a third request from the second user, the first request indicating a third type of project information, wherein the third type of project information comprises infrastructure impact information;
 receive, via the third interface module, the third type of project information; and
 store the third type of project information in the memory.

11. The system of claim 10, wherein the one or more processors are further operable to:
 retrieve, from the one or more memory modules and based upon the initiated one or more workflows, a third subset of the third type of project information; and
 format the third subset of the third type of project information according to the initiated one or more workflows.

12. The system of claim 7, wherein the project requirements information comprises one or more of the following:
 project milestones;
 project milestone deadlines; and
 project deliverables.

13. A system, comprising a first interface module, processor a memory and further comprising:
 an aggregation engine, executed by the processor to:
  initiate the first interface module in response to a first request from a first user, the first request indicating a first type of project information;
  receive, via the first interface module, the first type of project information; and
  store the first type of project information in the memory;
 a workflow engine, executed by the processor to:
  initiate one or more of a plurality of workflows, wherein the initiated one or more workflows indicate certain project information for approval by an external group;
  retrieve, from the memory and based upon the initiated one or more workflows, a first subset of the first type of project information; and
  format the first subset of project information according to the initiated one or more workflows; and
 an export engine, executed by the processor to transmit the formatted first subset of project information and a request for approval to a first external group and a second external group according to the initiated one or more workflows;
 receive, via a receiving interface module, a first response from the first external group and a second response from the second external group, the first and second responses comprising one of an approve response and a deny response;
 upon a determination that the first response is an approve response and the second response is an approve response, communicate the first and second responses to the first user; and
 store, in the memory, audit approval data in an audit log, the audit approval indicating the identity of the first and second external groups, the time the first and second responses were received, and whether the first and second responses were approve responses or deny responses, wherein the data aggregation engine is further operable to logically group the first and second type of project information before storage in the memory.

14. The system of claim 13, wherein the aggregation engine is further operable to:
 initiate a second interface module in response to a second request from a second user, the second request indicating a second type of project information;
 receive, via the second interface module, the second type of project information; and
 store the second type of project information in the memory.

15. The system of claim 14, wherein the workflow engine is further operable to:
 retrieve, from the memory and based upon the initiated one or more workflows, a second subset of the second type of project information; and
 format the second subset of project information according to the initiated one or more workflows.

16. The system of claim 15, wherein the expert engine is further operable to transmit the formatted second subset of project information along with the first subset of project information to the external group according to the initiated one or more workflows.

17. The system of claim 14, wherein the first type of project information comprises project requirements information and the second type of project information comprises project assumptions information.

18. The system of claim 14, wherein the project requirements information comprises one or more of the following:
 project milestones;
 project milestone deadlines; and
 project deliverables.

\* \* \* \* \*